United States Patent
Adams et al.

[19]

[11] Patent Number: 6,067,745
[45] Date of Patent: May 30, 2000

[54] FISHERMAN'S COOLER INSERT

[76] Inventors: Robert S. Adams, 4175 Ferncreek Dr., Fayetteville, N.C. 28314; Led Ford, 504 Patton St., Fayetteville, N.C. 28311

[21] Appl. No.: 08/922,627

[22] Filed: Sep. 3, 1997

Related U.S. Application Data

[63] Continuation of application No. 08/629,760, Apr. 9, 1996, abandoned.

[51] Int. Cl.⁷ .................................................. A01K 97/04
[52] U.S. Cl. ..................................................................... 43/55
[58] Field of Search ............................................ 43/55, 56

[56] References Cited

U.S. PATENT DOCUMENTS

| | | | |
|---|---|---|---|
| 752,600 | 2/1904 | Sinclair | 43/55 |
| 1,490,868 | 4/1924 | Voell | 43/55 |
| 2,603,028 | 7/1952 | Roberts | 43/55 |
| 2,722,770 | 11/1955 | Giordano | 43/55 |
| 3,025,629 | 3/1962 | Sears | 43/55 |
| 3,143,263 | 8/1964 | Farmer | 43/55 |
| 3,315,402 | 4/1967 | Scott | 43/55 |
| 3,559,329 | 2/1971 | Chiu | 43/55 |
| 4,070,786 | 1/1978 | Dunham | 43/55 |
| 5,212,905 | 5/1993 | Moorhead | 43/55 |
| 5,249,388 | 10/1993 | Crabtree | 43/55 |

*Primary Examiner*—Kurt Rowan
*Attorney, Agent, or Firm*—Mills Law Firm PLLC

[57] ABSTRACT

An ice cooler for storing and refrigerating caught fish has a removable top lid provided with an insert having separated teeth to seal the lid and thereby the cooler. The teeth retentively engage the body of a hooked fish disposed tail-first therewith preparatory to the fish being unhooked by a fisherman for the fish's own downward movement through the engaging teeth and into the cooler by the fish's own force of gravity. The teeth have their own memory to spring-back to re-seal and close the lid upon cessation of physical contact with the fish.

6 Claims, 2 Drawing Sheets

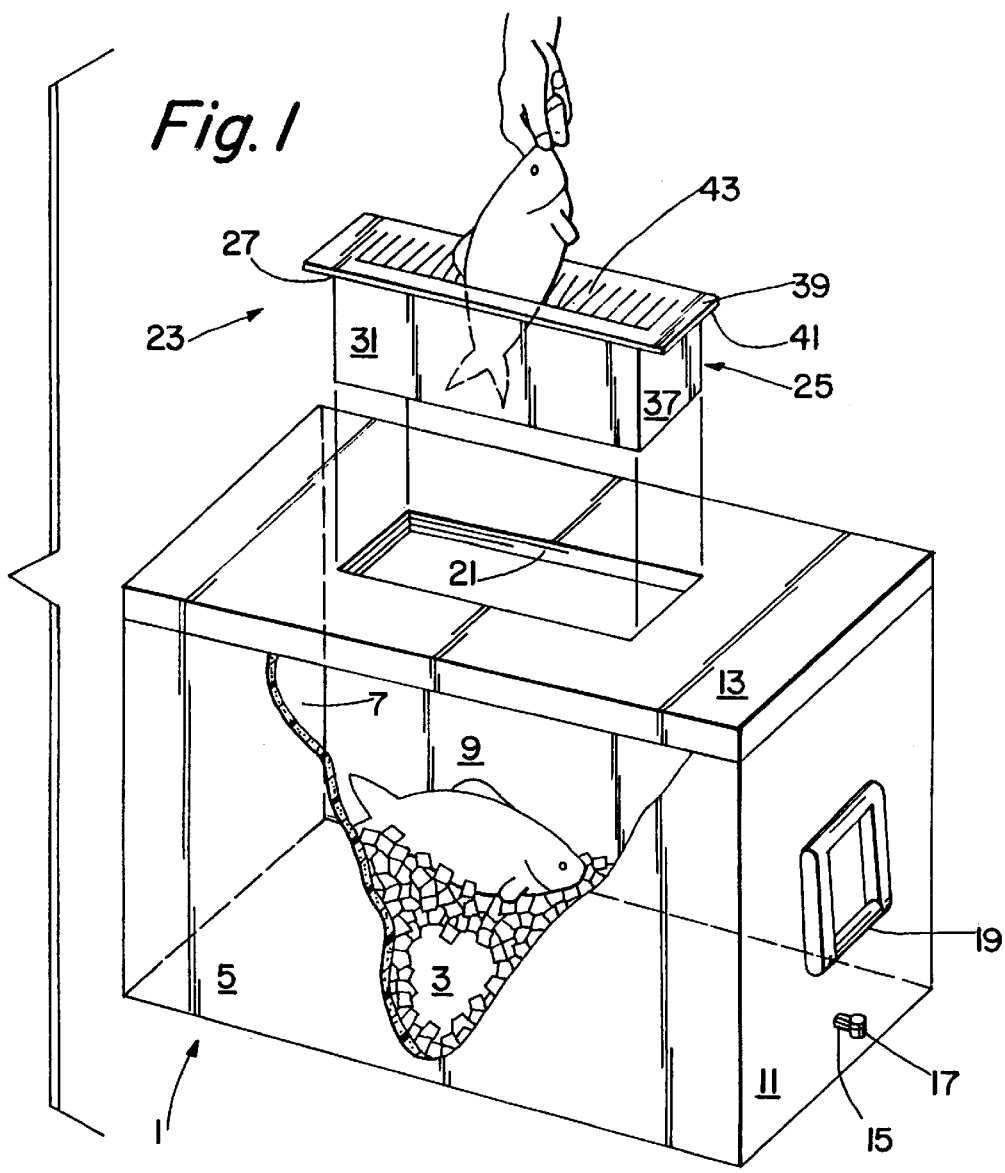
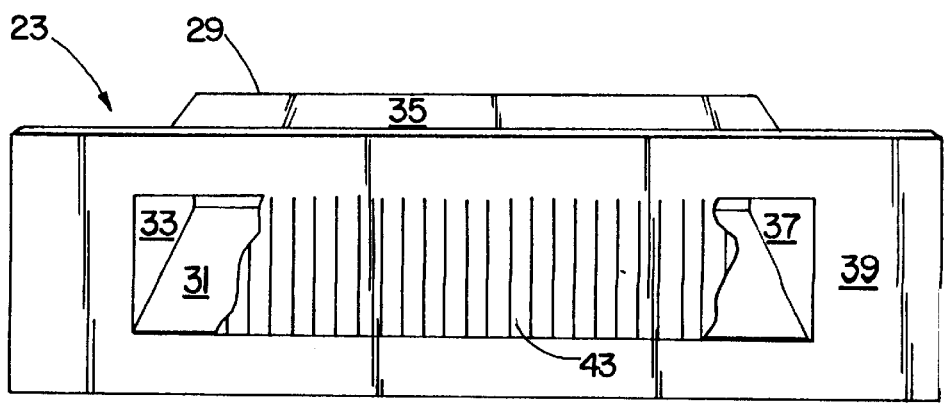

FISHERMAN'S COOLER INSERT

This application is a continuation of application Ser. No. 08/629,760 filed Apr. 9, 1996 now abandoned.

BACKGROUND OF THE INVENTION

1. Technical Field

This invention relates to a fisherman's cooler insert for use with the top lid of a portable ice cooler, by means of which a fisherman can safely store his caught fish within the cooler at a safe temperature below 40° F. for a substantial length of time without the need for opening the lid, thus preventing contamination/poisoning.

2. Background

It is imperative to keep caught fish alive or stored below 40° F. in order to prevent food contamination/poisoning because a fish's infectious bacterial agents replicate and produce toxins at 40° F. and above, while all infectious bacterial agents experience marked reduction in their ability to replicate and produce such toxins below 40° F. A prudent fisherman on a day's fishing expedition or outing stores his caught fish in an ice cooler containing ice and the time it takes to melt the ice with the consequent water temperature in the cooler reaching 40° F will depend upon how long the cooler remains open while the fisherman unhooks his caught fish and deposits it in the cooler, and the number of times this cycle must be repeated with respect to subsequently caught fish. Cold air is lost from the cooler and the melting of ice with its consequent change of state to water and the warming of such water is progressively accelerated on each and every occasion that the cooler is opened to deposit a fish in the cooler. Contributing factors are the type and size of the fish, and the time it takes the fisherman to remove an imbedded hook from a squirming and thrashing fish, and whether the fisherman maintains physical control over the fish. Another contributing and delaying time factor that will necessitate keeping the cooler open is that fish previously deposited in the cooler may wiggle or jump out and will have to be retrieved and redeposited in the cooler. As the cooler becomes filled with more fish, the easier it will be for previously deposited fish to jump out when the cooler is opened. And another contributing factor will be the travel time required in traveling to and returning home from his fishing trip.

In a scientific experiment conducted by the applicants under identical conditions for purposes of comparing the efficacy and efficiency of their invention with a state-of-the-art invention, the water temperature in their cooler remained below 40° F. for 21 hours and 50 minutes, while the water temperature in the state-of-the-art invention's cooler, otherwise identical to theirs, remained below 40° F. for only 10 hours and 40 minutes, for a 104.68% improvement of their invention over the state-of-the-art invention. The PETITION TO MAKE SPECIAL, accompanying the filing of this patent application, including the applicants' sworn affidavit with respect to their comparison experiment scientifically conducted by them, is fully incorporated herein to the same effect as if the same were fully set forth in full herein.

SUMMARY OF THE INVENTION

Accordingly, the objects of this invention are to contribute to the solutions of the discussed problems of the art by providing an insert, sealed by comb-like separated teeth, for the top lid of the cooler by means of which the internal water temperature within the cooler upon melting of the ice will remain below 40° F. for a substantial length of time because the insert's separate teeth that, in their inoperative-use mode, automatically seal the top lid and cooler to prevent the escape of cold air and water. In their operative-use mode, the teeth will be mechanically depressed or deflected for a matter of seconds from being engaged by the hooked fish in its inserted tail-first disposition therewith, preparatory to the fisherman's manipulatively twisting the engaged hook to free same from the fish's mouth, in consequence of which the fish, by its own force of gravity, will freely slide downwardly through the engaging teeth and into the cooler with the teeth thereupon springing-back and automatically being restored to their inoperative-use mode. The insert's depending walled duct functions as a baffling splash guard to physically prevent fish theretofore deposited in the cooler from upward escape therethrough and through the closed and sealed teeth above and to minimize the possibility of cold air and water from escaping upwardly within the baffling duct and through the closed and sealed teeth above as a result of fish flopping about and splashing in the cooler. In their inoperative-use mode, the closed and sealing teeth will further act as a mechanical barrier to prevent insects from entering therethrough and contaminating the interior contents of the cooler, including captured fish within the cooler. Upon hooking a fish, the fisherman does not need to make manipulative contact with his hooked fish with his hands because he merely needs to appropriately reel-in the caught fish or appropriately retrieve the fishline, manipulatively grasp the exposed shank portion of the hook between the thumb and forefinger of one hand, deposit the fish tail-first for retentive engagement thereby with the separated teeth and manipulatively twist the hook appropriately for its release from the fish's mouth for sliding movement of the fish downwardly into the cooler to thereby avoid transfer to himself of disease from exterior slime and other harmful bacterial agents. In addition to which, the engaging teeth, depressed or deflected in their operative-use mode, with the unhooked fish sliding downwardly, further function and serve to cleanse the fish of slime and other harmful bacterial agents. Reference is made to the PETITION TO MAKE SPECIAL, together with the applicants' sworn affidavit, incorporated herein.

BRIEF DESCRIPTION OF THE DRAWINGS

These objects and other objects of the invention should be discerned and appreciated from the detailed description of the preferred embodiment, taken in conjunction with the drawing figures, wherein like reference numerals refer to similar parts throughout the several views, in which:

FIG. 1 is an assembly view of the invention in perspective, partly broken-away and in section;

FIG. 2 is a perspective view of the fisherman's cooler insert that is of integral, one-piece construction;

DETAILED DESCRIPTION OF THE PREFERRED EMBODIMENT

Figure 3:
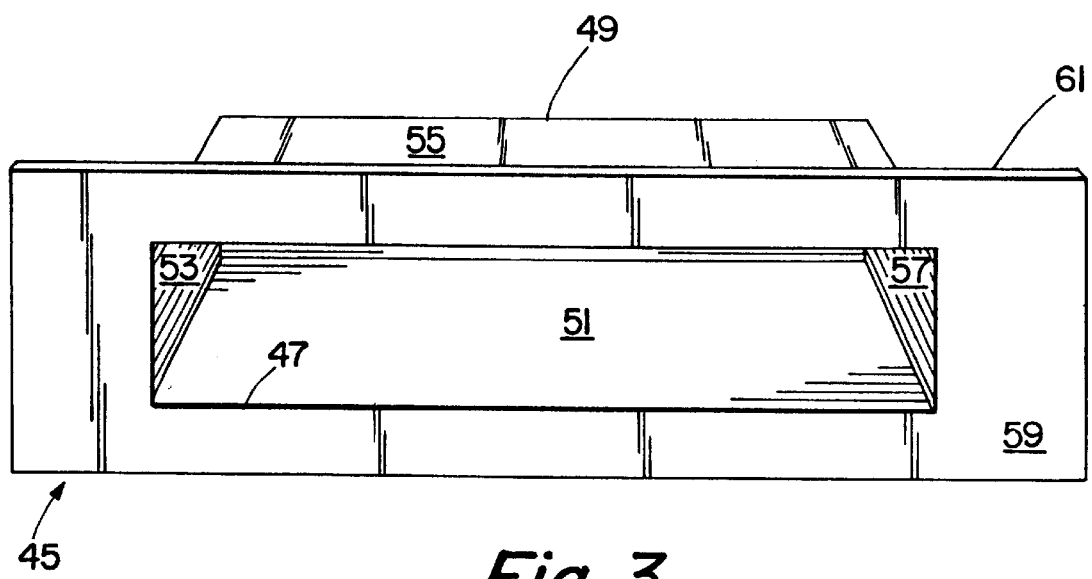
FIG. 3 is a perspective view of a separate duct portion.

In FIG. 1 of the drawings, reference numeral 1 generally refers to a conventional portable ice cooler having a bottom 3, lateral walls 5, 7, 9 and 11, a top lid or cover 13 that is removable, a conventional drain 15 whose sealing cap 17 can be removed to drain liquid therefrom and thereafter replaced, and opposed handles 19 (only one of which is shown), conventionally mounted on their respective lateral walls to facilitate carrying, moving or positioning the cooler 1. The top lid 13 is centrally provided with an opening 21 therethrough. The fisherman's cooler insert, generally referred to by reference numeral 23 and whose material of choice is plastic, in of integral, one-piece construction. The insert 23 has a vertically depending duct 25, having respective proximal and distal ends 27 and 29, whose lateral walls 31, 33, 35 and 37, though substantially complemental with the opening 21 through the top lid 13, cross-sectionally are slightly larger dimensionally than the dimensional opening afforded by the opening 21 to provide interference fit therewith to thereby fixedly carry the duct 25 upon its insertion within the opening 21. Laterally outturned and projecting from the proximal end 27 of the duct 25 is a perimeter flange 39 whose bottom surface 41 is disposed in superposed abutting relationship with the common mating surface of the top lid 13 upon full insertion of the duct 25 through the opening 21. Preparatory to such described insertion of the duct 25 within the opening 21 provided in the top lid 13, waterproof adhesive may also be appropriately applied to the bottom surface 41 of the flange 39 to provide additional fixed securement with its common mating surface of the top lid 13. Flange 39 has, of integral, one-piece construction therewith, comb-like separated teeth 43 having their own inherent memory, such that upon any of the separated teeth 43 being engaged, depressed or deflected upon a fish being inserted therethrough, or tail-first as depicted in FIG. 1, such engaged, depressed or deflected teeth, upon being relieved of such engagement, depression or deflection thereupon from the fish having been deposited within the interior of the cooler via the duct 25, the teeth theretofore engaged, depressed or deflected in their operative-use mode by the fish will automatically spring-back and be restored to their original positions and inoperative-use mode, as depicted in FIG. 2, coplanar with the flange 39 and thereby sealing the interior opening of the duct 25 defined by the interior surfaces of its lateral walls 31, 33, 35 and 37. FIG. 1 depicts ice theretofore deposited within the cooler 1 to provide refrigeration, with a fish depicted as deposited therein and lying upon the ice. Conventionally, a fish is hooked in its mouth by its distal barbed hook with the eyeletted shank portion being exposed. Upon his thusly hooking a fish, a fisherman can simply and appropriately reel-in the fishline, or otherwise appropriately retrieve the fishline, to "land" the hooked fish. In practicing this invention, a fisherman, with his favored hand, can manipulatively grasp the hook's exposed shank portion digitally between the first phalanges of his thumb and forefinger; transfer or carry thereby his hooked fish to the cooler to insert the hooked fish tail-first, as exemplified in FIG. 1, within the separated. teeth 43, thereby causing the separated teeth 43 by such engagement to be depressed or deflected, and thereby to retentively engage the fish's body, retaining and maintaining such fish in its tail-first disposition; and thereupon he can simply and appropriately twist the hook's exposed shank portion to disengage and free the hook, in consequence of which such fish, by force of its own gravity, will simply slide downwardly through the engaging teeth and into the cooler with the teeth thereupon springing-back and being restored to their inoperative-use mode to close and reseal the top lid 13. There are two advantages in thusly practicing this invention, as described. First, the fisherman can avoid mechanical transfer to himself and consequent bacterial contamination from exterior slime and other harmful bacterial agents. Second, the engaging teeth will automatically cleanse the fish of such exterior slime and other harmful bacterial agents.

Figure 4:
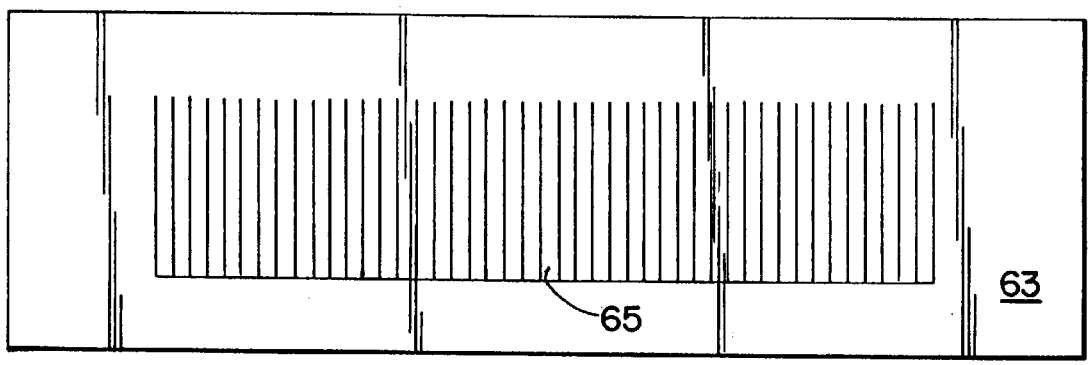
FIG. 4 is a top plan view of a perimeter flange with its comb-like separated teeth.

Instead of the cooler insert 23 being of integral, one-piece construction, as depicted in FIG. 2, the cooler insert can consist, as shown in FIG. 3, of a separate duct portion 45 having respective proximal and distal ends 47 and 49, whose lateral walls 51, 53, 55 and 57 likewise provide interference fit with the opening 21 through the top lid 13. Laterally outturned and projecting from the proximal end 47 of the duct portion 45 is a perimeter flange 59 whose bottom surface 61 is likewise disposed in superposed abutting relationship with the common mating surface of the top lid 13 upon full insertion of the duct portion 45 through the opening 21. The bottom surface 61 likewise may be adhesively joined with the common mating surface of the top lid 13 by the appropriate application of waterproof adhesive. FIG. 4 depicts a separate perimeter flange 63 of integral, one-piece construction. The material of choice for both the duct portion 45 and the perimeter flange 63 is likewise plastic. The flange 63 has separated teeth 65 that, in their inoperative-use mode similarly seals the interior opening of the duct portion 45 defined by the interior surfaces of the lateral walls 51, 53, 55 and 57. The common bottom mating surface 61 of the separate perimeter flange 63 is likewise joined to the common mating surface presented by the perimeter flange 59 of the duct portion 45 by the appropriate application of waterproof adhesive. The separated teeth 65 likewise have their own inherent memory and likewise function in all respects as the separated teeth 43. Assuming for the purposes of discussion and further explanation that both the separated teeth 43 and 65 are of appropriate width for larger fish, such as salmon, the separated teeth 43 and 65 would have to be of narrower width to afford thereby greater flexibility to be utilized for smaller fish, such as trout. By utilizing such separate flange having narrower teeth to the separate duct portion 45, the fisherman would be afforded the option of fishing for smaller fish, such as trout.

Another optional means of effecting fixed securement of the perimeter flange 39 with the top lid 13, or of effecting securement of the separate flanges 63 and 59 with the top lid 13, would be to settle and tighten plastic screws, of the type comparable to sheet-metal screws, through preformed and aligned holes in the perimeter flange 39 and the top lid 13, or in the flanges 63 and 59 and the top lid 13, respectively; or, in lieu of plastic screws, to appropriately apply "pop" rivets.

What is claimed is:

1. A thermal insulated enclosure for refrigeration of perishable items comprising: a thermal insulated box structure having a storage compartment and a removable top lid for enclosing the storage compartment having an exterior surface and a generally rectangular opening formed therein; and an insert member including a flange member and a duct member, said duct member defined by a tubular section received within said opening, said flange member peripherally engaging said exterior surface of said top lid and extending outwardly of said section of said duct member, a plurality of substantially uniform width and uniform length deflectable teeth formed integrally with said flange member and overlying said opening, said teeth having a normal position in said opening parallel to said exterior surface of said top lid and being deflected inwardly so as to retentively engage said items between said teeth and said tubular section (of said duct member enabling said items to be passed to said storage compartment by deflecting said teeth, which then return to said normal position.

2. The thermal insulated enclosure as recited in claim 1 wherein said duct member is a thin walled tubular section.

3. The thermal insulated enclosure as recited in claim 2 wherein said flange member and said duct member are integrally formed.

4. The thin insulated enclosure as recited in claim 3 wherein said insert member is a one-piece plastic molding.

5. In a cooler chest capable of storing ice for refrigeration of perishable items such as caught fish, said cooler chest including a thermal insulated, box-shaped structure having a top lid with an exterior surface, said lid having an opening formed therein, an insert for permitting individual delivery of items for storage comprising:

a one-piece duct member defined by a tubular section having a sliding fit within said opening; a one-piece flange member engagable with said exterior surface of the top lid and extending outwardly of said opening and said tubular section of said duct member, said flange member being defined by laterally spaced ends and transversely spaced sides; an aligned serious of substantially uniform length deflectable teeth formed integrally with one of said sides and extending toward and terminating adjacent to the other side of said flange member, said teeth being disposed in said opening parallel to said exterior surface of said top lid in an inoperative mode thereof and being deflected inwardly so as to retentively engage said items between said teeth and said tubular section of said duct member in an operative mode, enabling said items to be passed individually through said opening by deflecting said teeth which then return to said inoperative mode to prevent ambient conditions from affecting the interior temperature of the cooler chest.

6. In a thermal insulated enclosure for refrigeration of perishable items such as caught fish characterized by a thermal insulated box structure capable of storing ice and having a top lid having an exterior surface and a generally rectangular opening formed therein defined by a vertical surface, a one-piece insert for converting said enclosure into a fish cooler comprising:

a flange member integrally formed with a duct member, said duct member defined by a tubular section having a sliding compressive fit with said vertical surface of said opening; said flange member engagable with said lid and extending outwardly of said vertical surface of said opening and said tubular section of said duct member, said flange member being defined by laterally spaced ends and transversely spaced side; a plurality of substantially uniform width and uniform length deflectable teeth formed integrally with one of said sides of said flange member and extending toward and having ends terminating adjacent to the other of said sides of said flange member, said teeth having a memory and being disposed in said opening parallel to said exterior surface of said top lid in an inoperative mode and being deflected inwardly so as to retentively engage said items between said teeth and said tubular section of said duct member in an operative mode thereby enabling said items to be insulated from the ambient temperature to be passed through said opening by deflecting said teeth which then return to said inoperative mode to prevent said ambient temperature from affecting the temperature of the interior of the enclosure.

* * * * *